United States Patent [19]

Premiski et al.

[11] Patent Number: 4,776,237

[45] Date of Patent: Oct. 11, 1988

[54] THRUST WASHER ARRANGEMENT

[75] Inventors: Vladimir Premiski; Claudia Premiski, both of BAM-Willerscheid; Wilhelm Wehren, Kerpen, all of Fed. Rep. of Germany

[73] Assignee: Ford Motor Company, Dearborn, Mich.

[21] Appl. No.: 78,432

[22] Filed: Jul. 27, 1987

[30] Foreign Application Priority Data

Jul. 5, 1986 [DE] Fed. Rep. of Germany ....... 3622671

[51] Int. Cl.⁴ .......................... F16H 3/44; F16H 57/04
[52] U.S. Cl. ..................................... 74/750 R; 74/467; 384/420; 384/474
[58] Field of Search ............. 74/750 R, 467; 384/126, 384/368, 420, 474

[56] References Cited

U.S. PATENT DOCUMENTS 4,639,148  1/1987  Tamura et al. ...................... 384/420

FOREIGN PATENT DOCUMENTS 0054852  1/1984  European Pat. Off. .
3502076  10/1986  Fed. Rep. of Germany .
0140617  6/1986  Japan ................................. 384/474
0167712  7/1986  Japan ................................. 384/420

*Primary Examiner*—Dirk Wright
*Attorney, Agent, or Firm*—Donald J. Harrington; Keith L. Zerschling

[57] ABSTRACT

A thrust washer assembly for a planetary gear mechanism including a pair of thrust washers on each side of each planet gear of the mechanism, the planet gear being mounted on planet pinion shafts in a carrier by means of uncaged needle bearings, the washers directly adjacent the planet pinions having angularly spaced ports located at a position radially outward from the needle bearings and the washers between the ported washers and the carrier having sector-shaped recesses at diametrically opposite positions whereby the recesses and the ports register to establish a pumping action that circulates lubricating oil through the needle bearings.

16 Claims, 3 Drawing Sheets

THRUST WASHER ARRANGEMENT

BACKGROUND OF THE INVENTION

The invention relates to a thrust washer arrangement for planet gears in a planet gear carrier.

European Application No. 00 54 852 describes a prior art thrust washer design in which the thrust washers are disposed in pairs on both sides of planet gears. Needle bearings on planet gear pins secured in the planet gear carrier provide a bearing support for the planet gears. The peripheries of the thrust washers are provided with recesses for supplying lubricating oil to the needle bearings.

In this prior art thrust washer design, tapered guide surfaces and radial guide channels must be formed on the inner wall portions of the planet gear carrier in order to guide lubricating oil radially outward to recesses on the inner peripheries of the thrust washers. This is shown in FIGS. 5 and 9 of the European patent application.

A disadvantage of the prior art thrust washer is that on account of axial shifting of the helical planet gears under load, the continuous outer peripheries of the two thrust washers are pressed closely against one another in such a way that it is impossible to flush the bearing with lubricating oil. As a result, the desired cooling and lubrication cannot be achieved, at least during operation with thrust loading in one direction. In addition, tapered guide surfaces and radial guide channels on the planet gear carrier demand complicated machining.

Another prior art thrust washer design is shown in German Patent No. 35 02 076. That design has diametrically opposite, sector-shaped recesses of approximately 110° included angle arranged on its outer periphery. These recesses ensure that their apices guide lubricating oil to the needle bearing elements of the planet gears, without the need for tapered guide surfaces or radial guide channels machined for this purpose in the planet gear carrier.

BRIEF DESCRIPTION OF THE INVENTION

It is an object of the invention to provide an improved thrust washer design for planet gears in a planet gear carrier wherein rotational pinion gear speeds of up to 16,000 r.p.m. can occur while maintaining reliable lubrication and cooling of the needles of a needle bearing assembly, which revolve at half the rotational pinion gear speed.

Certain design features of the thrust washer described in German Patent No. 3,502,076 are incorporated in the present invention. For example, diametrically opposite, sector-shaped recesses of approximately 110° included angle are found in that prior art design. The recesses guide lubricating oil to the bearing needles. In the present design the outer washer similarly is formed with such recesses, but the inner thrust washers comprise a plurality of bores provided on a circle outside the radial location of the needles of the bearing and distributed nonuniformly over the periphery in such a way that at each relative position of the outer and inner thrust washers only one bore is exposed to each of the two apices of the recesses in the outer thrust washer. If thrust forces on the planet gears cause the two thrust washers to be pressed togehter, the needles of the needle bearing moving past the exposed port results in a pumping action which draws the lubricating oil into the adjacent bearing needle space. The lubricating oil then emerges on the other side of the planet gears where the thrust washers are not pressed together.

By virtue of the fact that a combined thrust washer arrangement of this type is provided on both sides of the planet gears, such a pumping action is ensured regardless of the direction of the thrust loading. Only the direction of the flow of the lubricating oil is being changed when thrust forces are reversed as it is directed from the compressed thrust washers to the loosely running thrust washers in each instance.

On account of the relative rotation of the two thrust washers, one with respect to other the other, the ingress and egress of oil takes place continuously at offset locations spaced 180° apart, as a result of which a more uniform lubrication of the entire periphery of the needle bearing is made possible.

By virtue of the fact that the two thrust washer clearly differ from one another in their shape, it is easier to ensure during assembly that the correct sequence of assembly of the thrust washers is observed. This sequence can be verified by visual checking following assembly. In contrast, the similar shape of the thrust washers of the design of European patent application No. 00 54 652 may cause confusion during assembly.

BRIEF DESCRIPTION OF THE DRAWINGS

The invention is described in greater detail with reference to an embodiment illustrated in the accompanying drawings, in which.

PARTICULAR DESCRIPTION OF THE INVENTION

Figure 1:
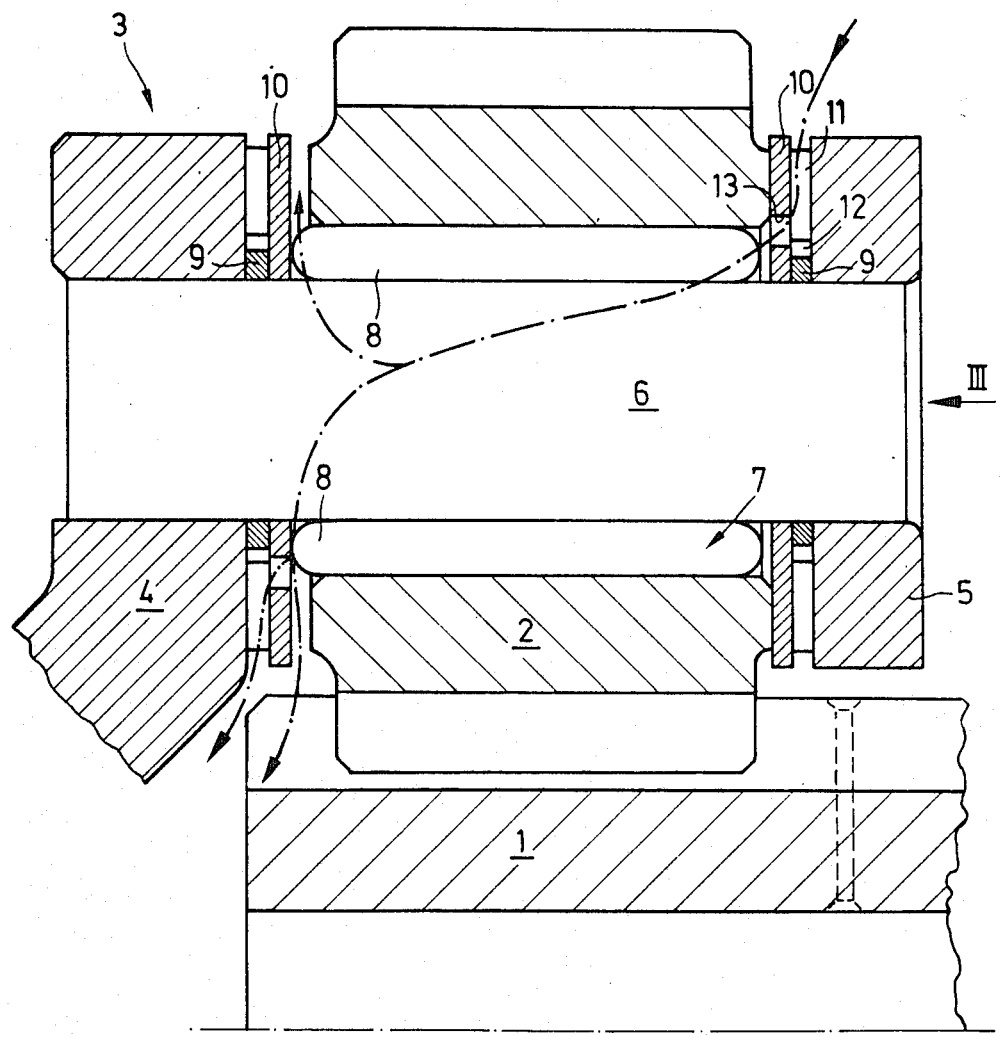
FIG. 1 is a vertical section through a planet gear bearing in a planet gear carrier with the thrust washer design of the invention wherein the thrust forces are directed to the right.
Figure 2:
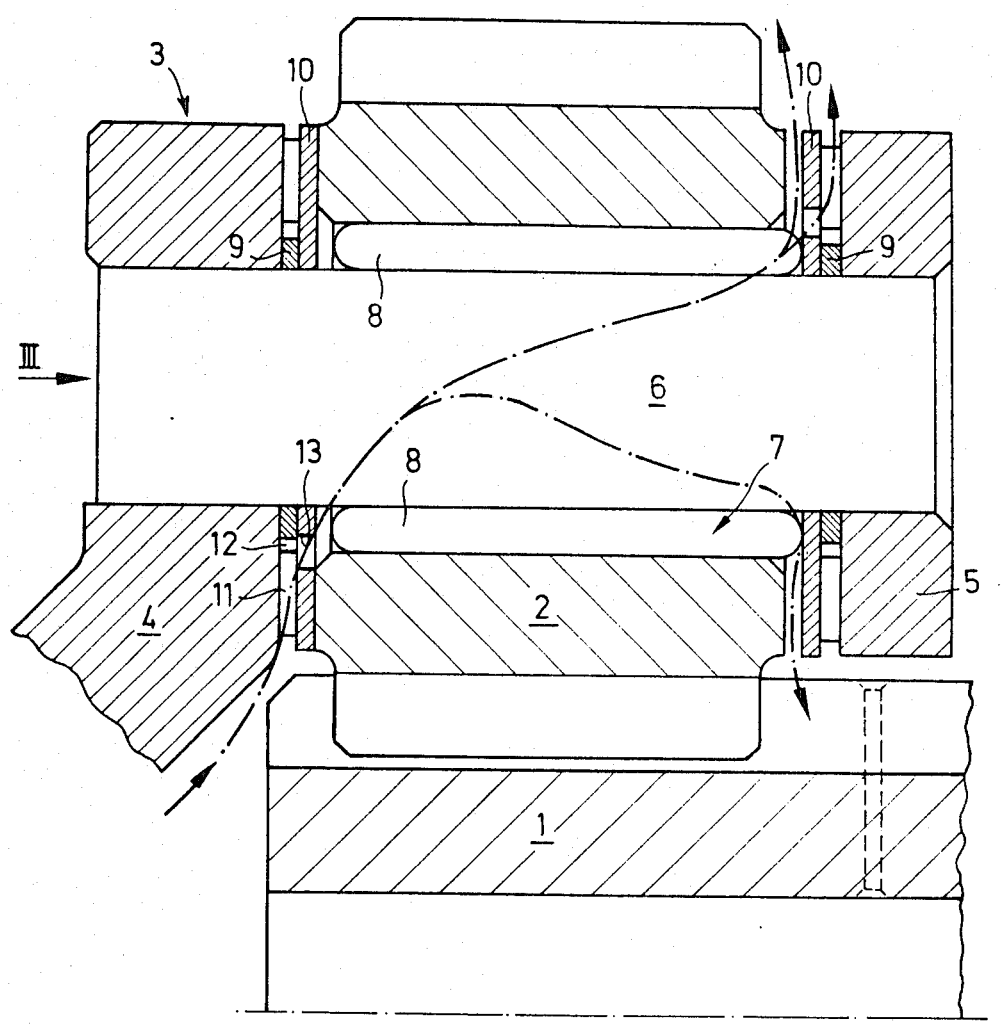
FIG. 2 is a vertical section through the planet gear bearing according to FIG. 1 with the thrust loads reversed.

FIGS. 1 and 2 show a sun wheel 1 with which a planet gear 2 engages. The planet gear 2 is mounted rotatably in a planet gear carrier 3. Companion planet gears are included but are not shown.

The planet gear carrier 3 comprises a planet gear carrier hub 4 and a planet gear carrier cage 5, which are connected together in a single assembly and which hold planet gear pins 6 fixed between them.

Planet gear 2 is mounted rotatably on planet gear pin 6 by means of a needle bearing assembly 7, which is normally produced only from a plurality of needles 8 without an inner or outer race and without a needle cage.

One outer thrust washer 9 and one inner thrust washer 10 are arranged on each side of the planet gear 2 in each case.

Figure 3:
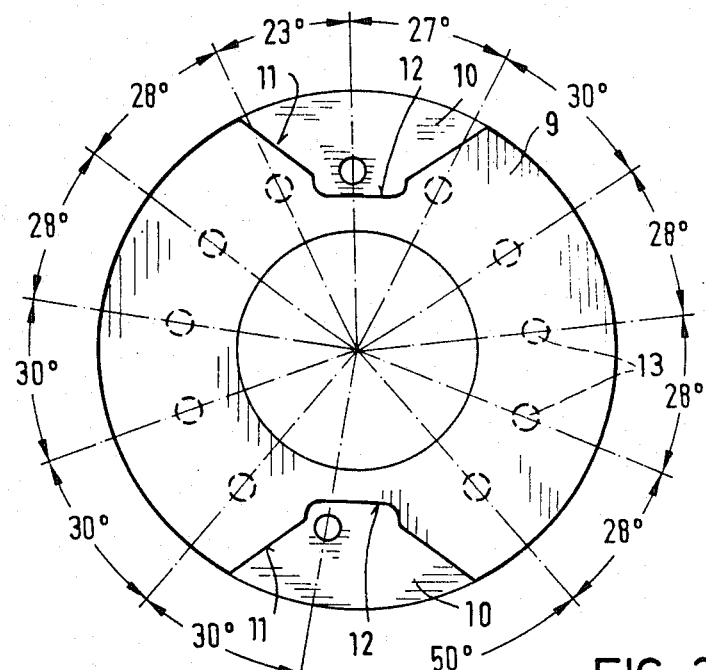
FIG. 3 is an elevation view of the thrust washer assembly of the present invention.

As may be seen from FIG. 3, each outer thrust washer 9 is formed on its outer periphery with two diametrically opposite, sector-shaped recesses 11 of approximately 110° included angle, the apices 12 of which are rounded and consist of bearing material such as, for example, bronze or aluminum alloy.

The inner thrust washers 10 comprise a plurality of bores 13 disposed on a circle outside the thrust circle of the needles 8 of the needle bearing assembly 7 and distributed nonuniformly around the periphery. The washers 10 consist of a hardened material.

In the case of the thrust loading illustrated in FIG. 1, the planet gear 2 is displaced axially to the right and it presses the two thrust washers 9 and 10 together. Lubricating oil can reach the bores 13 in the inner thrust washer 10 by way of the sector-shaped recesses 11 in the outer thrust washer 9 and their apices 12. It should be noted that the outer thrust washer 9 has a tendency to engage the side of the planet gear carrier cage 5 and that the inner thrust washer 10 has a tendency to rotate with the planet gear 2. This means that a sliding movement occurs primarily between the two thrust washers 9 and 10. The bores 13 of the inner thrust washer 10 thus continue to run past the recesses 11 and apices 12 of the outer thrust washer 9 and receive lubricating oil. The needles 8 of the needle bearing assembly 7 rotate while engaging inner thrust washer 10 and thus further enhance the pumping effect on account of the enhanced volume between their rounded ends as they are displaced axially to the left relative to the axial displacement of the planet gear 2. Needles 8 press the two thrust washers 9 and 10 away from the planet gear 2, thus making possible a free egress of the lubricating oil as indicated by the dash-dot arrows.

In the case of the thrust loading shown in FIG. 2, the planet gear 2 is displaced to the left and presses the two thrust washer 9 and 10 together. The needles 8 of the needle bearing assembly 7 are displaced, as illustrated, in the opposite axial direction. The lubricating oil indicated by dash-dot arrows flows through the bores 13 in the inner thrust washer 10 and through the recesses 11 and apices 12 provided in the outer thrust washer 9. After flowing through the bearing assembly 7 substantially axially, the oil emerges radially between the planet gear 2 and the shifted and released thrust washers.

What we claim is:

1. A planetary gear assembly comprising:
   a planetary carrier having spaced walls and a plurality of pinion shafts secured to and bridging said walls;
   a planet gear journalled on each pinion shaft, each pinion gear having a central opening of greater diameter than the diameter of its pinion shaft, and needle bearings in each pinion gear opening whereby the associated pinion shaft acts as an inner bearing race and the central opening of the pinion gear has a cylindrical surface that acts as an outer bearing race; and
   a pair of thrust washers on each side of said pinion gear, one thrust washer of each pair directly adjacent said pinion gear having ports therethrough located radially outward of said needle bearings, the other thrust washer of each pair having peripheral recesses at angularly spaced locations that register with the ports in the one thrust washer as the thrust forces on the pinion gear cause said thrust washers to be pressed together at any relative angular position of the thrust washers.

2. The combination as set forth in claim 1 wherein said peripheral recesses are located with a spacing of 180°.

3. The combination as set forth in claim 1 wherein each of said recesses is sector-shaped with an included angle of approximately 110° and with an apex located radially inward of the needle bearings.

4. The combination as set forth in claim 2 wherein each of said recesses is sector-shaped with an included angle of approximately 110° and with an apex located radially inward of the needle bearings.

5. The combination as set forth in claim 1 wherein only one of said ports in said one thrust washer registers with each recess in the other thrust washer.

6. The combination as set forth in claim 2 wherein only one of said ports in said one thrust washer registers with each recess in the other thrust washer.

7. The combination as set forth in claim 3 wherein only one of said ports in said one thrust washer registers with each recess in the other thrust washer.

8. The combination as set forth in claim 4 wherein only one of said ports in said one thrust washer registers with each recess in the other thrust washer.

9. The combination as set forth in claim 1 wherein said planet gear is shiftable on its pinion shaft in either axial direction depending upon the direction of thrust forces acting thereon, said planet gear pressing together the thrust washers of one pair when it is shifted in one direction while releasing the thrust washers of the other pair for free rotary movement thereof.

10. The combination as set forth in claim 2 wherein said planet gear is shiftable on its pinion shaft in either axial direction depending upon the direction of thrust forces acting thereon, said planet gear pressing together the thrust washers of one pair when it is shifted in one direction while releasing the thrust washers of the other pair for free rotary movement thereof.

11. The combination as set forth in claim 3 wherein said planet gear is shiftable on its pinion shaft in either axial direction depending upon the direction of thrust forces acting thereon, said planet gear pressing together the thrust washers of one pair when it is shifted in one direction while releasing the thrust washers of the other pair for free rotary movement thereof.

12. The combination as set forth in claim 4 wherein said planet gear is shiftable on its pinion shaft in either axial direction depending upon the direction of thrust forces acting thereon, said planet gear pressing together the thrust washers of one pair when it is shifted in one direction while releasing the thrust washers of the other pair for free rotary movement thereof.

13. The combination as set forth in claim 5 wherein said planet gear is shiftable on its pinion shaft in either axial direction depending upon the direction of thrust forces acting thereon, said planet gear pressing together the thrust washers of one pair when it is shifted in one direction while releasing the thrust washers of the other pair for free rotary movement thereof.

14. The combination as set forth in claim 6 wherein said planet gear is shiftable on its pinion shaft in either axial direction depending upon the direction of thrust forces acting thereon, said planet gear pressing together the thrust washers of one pair when it is shifted in one direction while releasing the thrust washers of the other pair for free rotary movement thereof.

15. The combination as set forth in claim 7 wherein said planet gear is shiftable on its pinion shaft in either axial direction depending upon the direction of thrust forces acting thereon, said planet gear pressing together the thrust washers of one pair when it is shifted in one direction while releasing the thrust washers of the other pair for free rotary movement thereof.

16. The combination as set forth in claim 8 wherein said planet gear is shiftable on its pinion shaft in either axial direction depending upon the direction of thrust forces acting thereon, said planet gear pressing together the thrust washers of one pair when it is shifted in one direction while releasing the thrust washers of the other pair for free rotary movement thereof.

* * * * *